United States Patent [19]
Loftus et al.

[11] Patent Number: 5,129,025
[45] Date of Patent: Jul. 7, 1992

[54] OPTICAL THERMAL SENSING DEVICE IN FIRED OIL TREATERS

[75] Inventors: Jordan Loftus, Houston; George M. Welch, Jr., Rosharon, both of Tex.

[73] Assignee: Texaco Inc., White Plains, N.Y.

[21] Appl. No.: 656,366

[22] Filed: Feb. 19, 1991

[51] Int. Cl.⁵ ............................ G02B 6/00; G02B 6/36
[52] U.S. Cl. ...................................................... 385/88
[58] Field of Search ..... 350/96.10, 96.15, 96.20–96.22

[56] References Cited

U.S. PATENT DOCUMENTS

| | | |
|---|---|---|
| 4,397,283 | 8/1983 | Komaroff et al. ............... 350/96.10 |
| 4,889,407 | 12/1989 | Markle et al. .................... 350/96.10 |
| 5,029,977 | 7/1991 | Wheeler et al. .................. 350/96.10 |

Primary Examiner—Akm E. Ullah
Attorney, Agent, or Firm—Jack H. Park; Kenneth R. Priem; Russell J. Egan

[57] ABSTRACT

An optical fiber thermal sensor is mounted in an operative position by a member fixed to the unit to be monitored. The member has an axial bore and means to position the optical fiber therein. The member is also profiled so as to not affect measurement by causing heat build-up or drain from around the optical fiber.

10 Claims, 1 Drawing Sheet

OPTICAL THERMAL SENSING DEVICE IN FIRED OIL TREATERS

BACKGROUND OF THE INVENTION

1. The Field of the Invention

The present invention concerns an optical fiber sensing device and in particular to such a device used to determine temperatures in a fired oil-treating device.

2. The Prior Art

It is well known that hydrocarbon products, when they initially are recovered from the ground, have a wide range of compositions and characteristics which require many different kinds of treatments. The preferred treatments for some of these hydrocarbon products is to initially heat the crude to approximately 210° F. which causes separation of water and the volatile hydrocarbons from the remaining crude. This is generally accomplished by having a heater which sends flame into a closed burner conduit which traverses a portion of a tank substantially filled with the crude. The heat provided by this burner causes the previously mentioned separation. However, there is a danger that the heat provided by the burner may become too great causing the burner conduit to become exposed to the gas separated from the remaining crude. Unduly heating this gas, which is highly volatile, creates an extremely dangerous condition with the possibility of the gas being ignited by the hot burner conduit. In the past the solution for this problem has been to use thermocouples spaced along the burner conduit and adapted to actually control both the flow of fuel to the burner and flow of the crude into the tank to assure that the tank is always properly filled to the desired operating level. However, thermocouples have not always proved to be durable in this environment since the water separated from the crude is saline and therefore highly corrosive. Thus, the thermocouples must be provided with stainless steel wiring and the whole thing becomes rather clumsy and expensive.

SUMMARY OF THE INVENTION

The present invention obviates the difficulties of the prior art by providing a fiber optic sensor to provide thermo sensing in a hazardous environment. A plurality of optical thermal sensing devices are mounted in fixed spaced relationship along the device to be monitored. Each optical-thermal sensing device has a mounting member fixed to the monitored device and mounting an optical fiber cable assembly in proper position. The mounting device is formed in such manner as to prevent heat buildup or loss around the optical sensor.

BRIEF DESCRIPTION OF THE DRAWINGS

The present invention will now be described by way of example with reference to the accompanying drawings in which.

DETAILED DESCRIPTION OF THE EMBODIMENT

Figure 1:
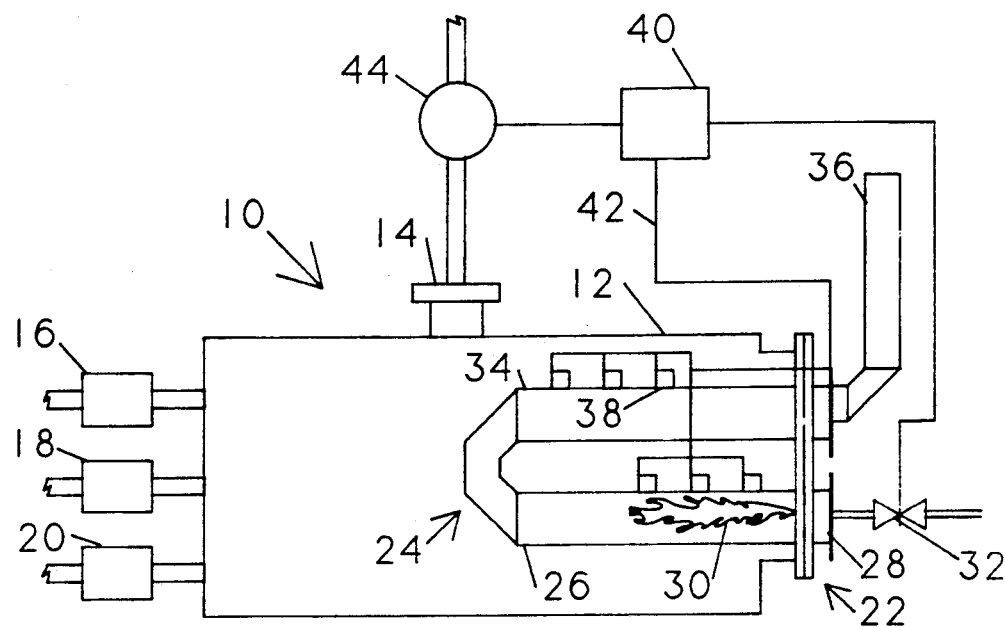
FIG. 1 is a schematic representation of a fired oil treating management system.

Turning now to FIG. 1, the management system 10 includes a tank 12 which has a crude inlet means 14, a gas outlet means 16, a petroleum outlet means 18 and a water outlet means 20. Inserted into one side of the tank 12 is a heater assembly 22 which has been shown as a horizontally disposed, elongated U-shaped heater tube 24 extending approximately halfway through the tank 12. The lower leg 26 of the tube contains a burner element 28 adapted to direct a heating flame 30 into at least a portion of the lower leg 26. The burner element 28 is provided with fuel through a valve 32 from a supply (not shown). The heater assembly 22 is capable of generating temperatures of up to 1200° C. in order to sufficiently heat the tank of crude to achieve the desired separation. The upper leg 34 of the U-shaped tube exits to a stack 36. The heater assembly 22 is provided with a plurality of sensors 38 which are connected to a control box 40 by conventional means 42. The control box 40 includes temperature monitoring and recording devices and control means (none of which have been shown) to control the flow of crude through valve 44 to the inlet means 14 as well as means to control the valve 32 controlling flow of fuel to the burner element 28.

In operation of this device, the tank 12 is kept substantially filled with crude oil while the burner heats the oil sufficiently to cause a separation of the heavier water and the more volatile, lighter gases from the remaining crude. These products are tapped off continuously through ports (not shown) as the supply of crude to be treated is constantly renewed. It is necessary to control both the level of the crude being treated and the temperature to which the crude is heated during operation to assure maximum separation and minimum danger.

Figure 2:
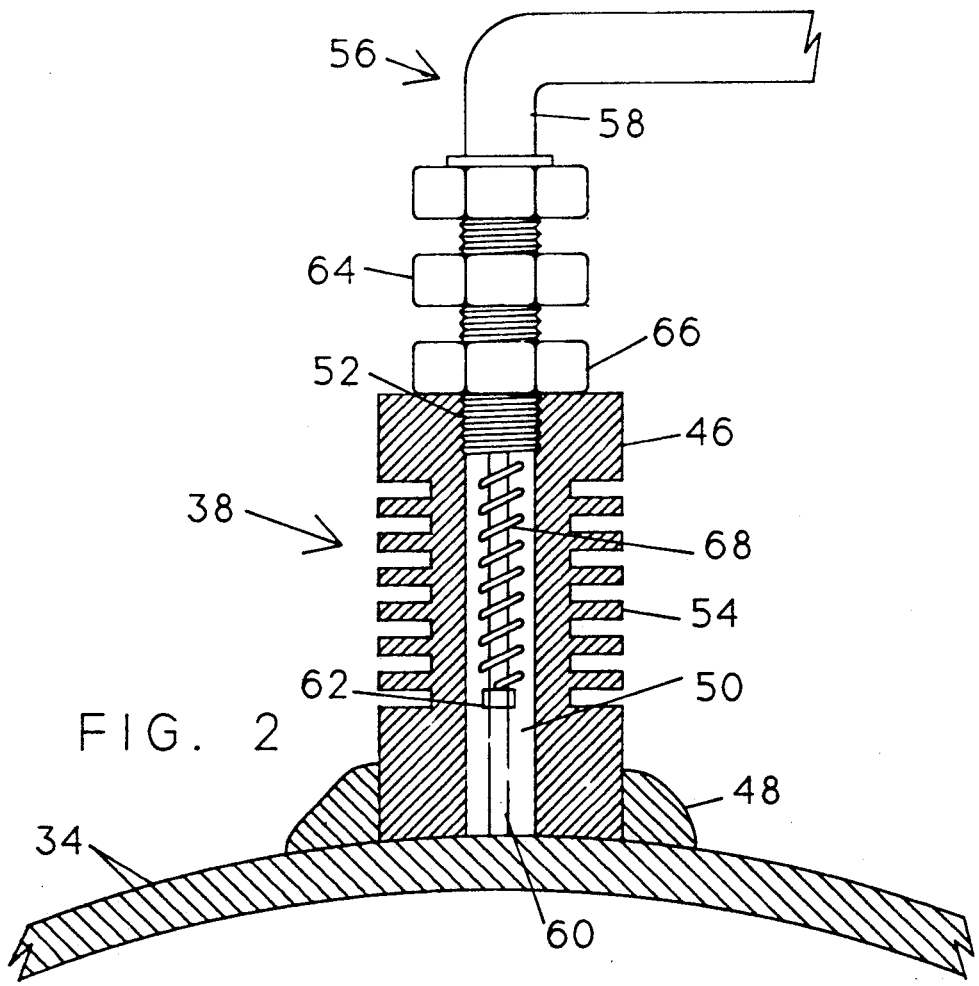
FIG. 2 is an enlarged detail, partly in section, showing the fiber optic mounting device according to the present invention.

Turning now to FIG. 2, a single fiber optic, thermal sensor 38, according to the present invention, is shown in detail and partially in section. A plurality of the fiber optic sensor devices 38 of the present invention are mounted on the burner tube 24 in spaced relation along the areas where temperature sensing is most critical, namely, immediately above the flame 30 in the lower leg 26 and along the uppermost surface of upper leg 34. The reason for the former is clear, namely to control the temperature of the burner flame so that it does not heat the crude to too high a temperature. The reason for the latter is to assure that a sufficient amount of crude is in the tank at all times so that the upper leg 34 of the heater tube 24 is not exposed to the volatile gases generated and possibly cause ignition.

The sensor itself includes a mounting member 46 which is welded at 48 to the tube 24. The mounting member 46 is a generally cylindrical member having an axial bore 50 provided at one end with an internal mounting thread 52 and externally with a plurality of fins 54 which both serve as a cooling heat sink and to reduce the wall thickness of the mounting member between the fins to be equal to or no greater than the thickness of the wall of the tube 24. This is important in order to assure that the mounting member 46 itself does not become a heat source and affect the temperature sensing.

A thermal sensing optical fiber cable assembly 56 has a non-metallic high temperature sheath 58 surrounding an optical fiber 60 which in turn is provided with a mounting flange 62. The cable assembly also includes at least one non-metallic mounting means 64 for engaging with a mounting means 66 which engages the internal threads 52 of mounting block 46. Spring means 68 act between mounting means 66 and mounting flange 62 to bias the optical fiber to the desired relative position with respect to the wall 24. The opposite end of the cable has not been shown but would be provided with means for coupling the optical fiber to receptor means (not shown) in the control box 40.

The present invention may be subject to many modifications and changes without departing from the spirit or essential characteristics thereof. The present invention should therefore be considered in all respects as illustrative and not restrictive as to the scope of the invention.

We claim:

1. Means for mounting a thermal sensitive optical fiber in sensing relationship with a device to be monitored, said mounting means comprising:
   a generally cylindrical member defining an axial bore extending from a mounting end to an optical cable receiving end, and having a plurality of radial fins for heat exchange to minimize heat build-up or loss within said bore;
   a thermal sensitive optical fiber cable assembly having one end profiled to be received in said bore; and
   means to secure said one end of said cable assembly in said bore.

2. The mounting means of claim 1 wherein said member in the space between the fins is no greater thickness than the wall of the device being monitored upon which said mounting means is mounted.

3. The mounting means according to claim 1 wherein said member is metallic.

4. The mounting means according to claim 1 wherein the mounting end of said member is profiled for attachment to the device to be monitored.

5. The mounting means according to claim 1 wherein said member is profiled to be welded to the device to be monitored.

6. The mounting means according to claim 1 wherein said optical cable receiving end of said member has an internal thread.

7. The mounting means according to claim 6 further comprising means for attaching said thermal sensitive fiber optic cable to said cable receiving end of said member.

8. The mounting means according to claim 7 further comprising means to bias said cable into proper position within said bore.

9. An apparatus for heating crude oil to separate volatile gases and water therefrom, said apparatus comprising:
   a tank having means to receive a constant supply of crude oil and means for continuously tapping off water, volatile gases and reduced crude oil therefrom;
   a heater assembly extending horizontally at least partially through said tank intermediate the upper and lower ends thereof so as to be in contact with and covered by said crude oil, said heater assembly including a burner and means to control said burner by controlling the flow of fuel thereto;
   means to monitor the temperature of said heater assembly, said monitoring means including at least one heat sensitive fiber optic cable assembly and mounting means to secure said cable assembly in heat sensing relationship with the heater assembly, said mounting means having said optical fiber therein and an exterior profile adapted to reduce the possibility of heat build-up or loss from around the optical cable.

10. The apparatus according to claim 9 wherein said member has an exterior profile defining a plurality of radial flanges with those portions of the member intermediate the flanges having a thickness no greater than the walls of the heater assembly being monitored.

* * * * *